United States Patent
Jiang (10) Patent No.: US 11,452,012 B2
(45) Date of Patent: Sep. 20, 2022

(54) METHOD, APPARATUS FOR CELL HANDOVER AND USER EQUIPMENT

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 99 days.

(21) Appl. No.: 16/597,843

(22) Filed: Oct. 9, 2019

(65) Prior Publication Data

US 2020/0045602 A1 Feb. 6, 2020

Related U.S. Application Data

(63) Continuation of application No. PCT/CN2017/080596, filed on Apr. 14, 2017.

(51) Int. Cl.
*H04W 36/00* (2009.01)
*H04W 36/30* (2009.01)
(Continued)

(52) U.S. Cl.
CPC .... *H04W 36/00837* (2018.08); *H04B 17/318* (2015.01); *H04W 36/0058* (2018.08);
(Continued)

(58) Field of Classification Search
CPC ....... H04W 36/00837; H04W 36/0079; H04W 36/305; H04W 36/0058; H04W 36/08;
(Continued)

(56) References Cited

U.S. PATENT DOCUMENTS

2006/0239229 A1* 10/2006 Marinescu ........ H04W 36/0022
370/331
2010/0124203 A1 5/2010 Tenny et al.
(Continued)

FOREIGN PATENT DOCUMENTS

CN 101111055 A 1/2008
CN 101998543 A 3/2011
(Continued)

OTHER PUBLICATIONS

European Patent Office, Office Action Issued in Application No. 17905454.9, dated Sep. 22, 2020, Germany, 7 pages.
(Continued)

*Primary Examiner* — Hoang-Chuong Q Vu
(74) *Attorney, Agent, or Firm* — Syncoda LLC; Feng Ma (57) ABSTRACT

A method of cell handover includes: when receiving a preset handover command transmitted by a base station for indicating a conditional handover command, determining a handover decision parameter corresponding to each target cell; when determining a target cell that meets a handover condition based on the handover decision parameter corresponding to each target cell, starting a preset timer and executing a cell handover operation from a current serving cell to the target cell that meets the handover condition; and when unsuccessfully executing the cell handover operation, recording first handover information in a radio link failure-report for reporting to the base station.

20 Claims, 4 Drawing Sheets

When receiving a preset handover command transmitted by a base station, determine a handover decision parameter corresponding to each target cell — 110

When determining a target cell which meets a handover condition based on the handover decision parameter corresponding to each target cell, start a preset timer and execute a cell handover operation from a current serving cell to the target cell which meets the handover condition — 120

When unsuccessfully executing the cell handover operation, record first handover information in a radio link failure-report — 130

(51) Int. Cl.
*H04W 36/08* (2009.01)
*H04B 17/318* (2015.01)

(52) U.S. Cl.
CPC ....... *H04W 36/0079* (2018.08); *H04W 36/08* (2013.01); *H04W 36/305* (2018.08)

(58) Field of Classification Search
CPC . H04W 36/0083; H04W 36/30; H04B 17/318
See application file for complete search history.

(56) References Cited

U.S. PATENT DOCUMENTS

| | | | |
|---|---|---|---|
| 2011/0080825 A1* | 4/2011 | Dimou | H04J 11/0086 370/216 |
| 2012/0064886 A1* | 3/2012 | Kim | H04W 24/04 455/423 |
| 2012/0202557 A1* | 8/2012 | Olofsson | H04W 36/0079 455/525 |
| 2012/0275394 A1* | 11/2012 | Gunnarsson | H04W 28/04 370/329 |
| 2013/0023269 A1* | 1/2013 | Wang | H04W 36/0072 455/436 |
| 2013/0072196 A1* | 3/2013 | Jung | H04W 36/24 455/437 |
| 2014/0126545 A1 | 5/2014 | Tamura et al. | |
| 2014/0148174 A1* | 5/2014 | Teyeb | H04W 52/0212 455/441 |
| 2014/0220963 A1* | 8/2014 | Jung | H04W 24/10 455/422.1 |
| 2014/0228018 A1 | 8/2014 | Zhang et al. | |
| 2015/0195762 A1* | 7/2015 | Watanabe | H04W 36/0079 455/436 |
| 2015/0249950 A1* | 9/2015 | Teyeb | H04W 28/08 455/437 |
| 2015/0271717 A1* | 9/2015 | Moon | H04W 36/0072 455/437 |
| 2015/0365854 A1 | 12/2015 | Bai et al. | |
| 2015/0373772 A1* | 12/2015 | Watanabe | H04W 76/19 455/436 |
| 2016/0285679 A1* | 9/2016 | Dudda | H04W 36/0055 |
| 2016/0302119 A1* | 10/2016 | Chen | H04W 76/23 |
| 2017/0070896 A1* | 3/2017 | Shindo | H04W 36/14 |
| 2017/0070924 A1* | 3/2017 | Wu | H04W 76/23 |
| 2017/0251417 A1* | 8/2017 | Lin | H04W 36/36 |
| 2017/0366920 A1* | 12/2017 | Agiwal | B60R 16/023 |
| 2019/0124566 A1* | 4/2019 | Liu | H04W 72/04 |
| 2019/0387440 A1* | 12/2019 | Yiu | H04W 36/0072 |
| 2020/0305094 A1* | 9/2020 | Ouchi | H04L 5/0055 |

FOREIGN PATENT DOCUMENTS

| | | |
|---|---|---|
| CN | 103329597 A | 9/2013 |
| CN | 103797846 A | 5/2014 |
| CN | 104322104 A | 1/2015 |
| CN | 105122886 A | 12/2015 |
| CN | 106385714 A | 2/2017 |
| WO | 2014040277 A1 | 3/2014 |

OTHER PUBLICATIONS

State Intellectual Property Office of the People's Republic of China, Office Action and Search Report Issued in Application No. 201780000223X, dated Oct. 19, 2020, 16 pages, (Submitted with Machine Translation).

ZTE, ZTE Microelectronics, "Discussion on single connected handover", 3GPP TSG-RAN WG2 Meeting#97bis, Spokane,USA, R2-1702824, Apr. 3-7, 2017, 5 pages.

European Patent Office, Extended European Search Report Issued in Application No. 17905454.9, dated Jan. 31, 2020, Germany, 12 pages.

Huawei et al, "Analysis on conditional handover" 3GPP TSG WG2 #97bis, R2-1703384, Apr. 3, 2017, 8 pages.

Intel Corporation, "Analysis of conditional handover" 3GPP TSG RAN WG2 Meeting #97bis, R2-1703415, Apr. 3, 2017. 4 pages.

ISA State Intellectual Property Office of the People's Republic of China, Written Opinion of the International Searching Authority Issued in Application No. PCT/CN2017/080596, dated Jan. 11, 2018, WIPO, 4 pages.

State Intellectual Property Office of the People's Republic of China, Office Action and Search Report Issued in Application No. 201780000223X, dated Apr. 17, 2020, 15 pages. (Submitted with Machine Translation).

Intellectual property India, Office Action Issued in Application No. 201947046180, dated Feb. 4, 2021, 6 pages.

State Intellectual Property Office of the People's Republic of China, Office Action and Search Report Issued in Application No. 201780000223X, dated Aug. 30, 2019, 14 pages,(SubmittedwithMachineTranslation).

ISA State Intellectual Property Office of the People's Republic of China, International Search Report Issued in Application No. PCT/CN2017/080596, dated Jan. 11, 2018, WIPO, 4 pages.

Ericsson, "Conditional Handover", 3GPP TSG-RAN WG2 #97 Tdoc R2-1700864, Jan. 17, 2017 (Jan. 17, 2017), pp. 1-5.

European Patent Office, Extended European Search Report Issued in Application No. 22169153.8, dated Jul. 21, 2022, Germany, 13 pages.

* cited by examiner

METHOD, APPARATUS FOR CELL HANDOVER AND USER EQUIPMENT

CROSS-REFERENCE TO RELATED APPLICATIONS

The present application is a continuation application of International Application No. PCT/CN2017/080596 filed on Apr. 14, 2017, the disclosure of which is incorporated herein by reference in its entirety.

BACKGROUND

With the rapid development of radio communication technologies and the widespread use of various smart terminals, mobile data traffic will have an explosive growth. An Ultra-Dense Network (UDN) technology has become one of the key technologies to improve data traffic in the 5th Generation (5G) mobile communication technologies. In the ultra-dense network, dense deployment of micro base stations causes the number of cells to increase dramatically, and because more numerous and irregular cell boundaries result in more complex and frequent handover, it is difficult to ensure mobility performance. In order to alleviate the problem of difficulty in ensuring the mobility performance, which is caused by cell handover in ultra-dense network scenarios, a manner of conditional handover is proposed in 5G wireless access network to alleviate the problem.

SUMMARY

The present disclosure relates generally to the field of communication technologies, and more specifically to a method, apparatus for cell handover and user equipment.

Various embodiments of the present disclosure provide a method, an apparatus for cell handover and user equipment to improve the mobility performance of UE.

According to a first aspect of examples of the present disclosure, a method of cell handover is provided, including:

when receiving a preset handover command transmitted by a base station, determining a handover decision parameter corresponding to each target cell, where the preset handover command indicates a conditional handover command;

when determining a target cell that meets a handover condition based on the handover decision parameter corresponding to each target cell, starting a preset timer and executing a cell handover operation from a current serving cell to the target cell that meets the handover condition; and when unsuccessfully executing the cell handover operation, recording first handover information in a radio link failure-report.

In some embodiments, the method further includes:
when a radio link failure occurs before determining the target cell that meets the handover condition based on the handover decision parameter corresponding to each target cell, recording second handover information in the radio link failure-report.

In some embodiments, the second handover information includes a time interval between a time when receiving the preset handover command and a time when the radio link failure occurs.

In some embodiments, the first handover information includes any one or a combination of two or more: a type of connection failure being a conditional handover failure, a time interval between a time when receiving the preset handover command and a time when unsuccessfully executing the cell handover operation, a time interval between a time when starting the preset timer and a time when unsuccessfully executing the cell handover operation, and cell identity information of the target cell that executes the cell handover operation.

In some embodiments, the method further includes:
obtaining a measurement result corresponding to each target cell by performing measurement for a signal from each target cell in real time; and
determining whether each target cell meets the handover condition based on the measurement result corresponding to each target cell and the handover decision parameter corresponding to each target cell.

In some embodiments, the method further includes:
when successfully executing the cell handover operation, stopping the preset timer.

In some embodiments, the method further includes:
receiving a request message for obtaining the radio link failure-report transmitted by the base station; and
transmitting a report message carrying the radio link failure-report to the base station.

According to a second aspect of examples of the present disclosure, an apparatus for cell handover is provided, including:

a first determining module, configured to determine a handover decision parameter corresponding to each target cell, when receiving a preset handover command transmitted by a base station, where the preset handover command indicates a conditional handover command;

a handover module, configured to start a preset timer and execute a cell handover operation from a current serving cell to a target cell that meets a handover condition, when determining the target cell that meets the handover condition based on the handover decision parameter corresponding to each target cell determined by the first determining module; and a first recording module, configured to record first handover information in a radio link failure-report, when unsuccessfully executing the cell handover operation by the handover module.

In some embodiments, the apparatus further includes:
a second recording module, configured to record second handover information in the radio link failure-report, when a radio link failure occurs before determining the target cell that meets the handover condition based on the handover decision parameter corresponding to each target cell.

In some embodiments, the second handover information includes a time interval between a time when receiving the preset handover command and a time when the radio link failure occurs.

In some embodiments, the first handover information includes any one or a combination of two or more: a type of connection failure being a conditional handover failure, a time interval between a time when receiving the preset handover command and a time when unsuccessfully executing the cell handover operation, a time interval between a time when starting the preset timer and a time when unsuccessfully executing the cell handover operation, and cell identity information of the target cell that executes the cell handover operation.

In some embodiments, the apparatus further includes:
a measuring module, configured to obtain a measurement result corresponding to each target cell by performing measurement for a signal from each target cell in real time; and
a second determining module, configured to determine whether each target cell meets the handover condition based on the measurement result corresponding to each target cell which is obtained by the measuring module and the handover decision parameter corresponding to each target cell.

In some embodiments, the apparatus further includes:

a stopping timing module, configured to stop the preset timer when successfully executing the cell handover operation.

In some embodiments, the apparatus further includes:

a receiving module, configured to receive a request message for obtaining the radio link failure-report transmitted by the base station; and a transmitting module, configured to transmit a report message carrying the radio link failure-report to the base station.

According to a third aspect of examples of the present disclosure, user equipment is provided, including:

a processor; and a memory for storing processor executable instructions;

where, the processor is configured to:

when receiving a preset handover command transmitted by a base station, determine a handover decision parameter corresponding to each target cell, where the preset handover command indicates a conditional handover command;

when determining a target cell that meets a handover condition based on the handover decision parameter corresponding to each target cell, start a preset timer and execute a cell handover operation from a current serving cell to the target cell that meets the handover condition; and when unsuccessfully executing the cell handover operation, record first handover information in a radio link failure-report.

According to a fourth aspect of examples of the present disclosure, a non-volatile machine-readable storage medium storing machine instructions is provided, where the instructions are executed by a processor to implement the following operations:

when receiving a preset handover command transmitted by a base station, determining a handover decision parameter corresponding to each target cell, where the preset handover command indicates a conditional handover command;

when determining a target cell that meets a handover condition based on the handover decision parameter corresponding to each target cell, starting a preset timer and executing a cell handover operation from a current serving cell to the target cell that meets the handover condition; and when unsuccessfully executing the cell handover operation, recording first handover information in a radio link failure-report.

It should be understood that the foregoing general description and the detailed description hereinafter are only illustrative and explanatory, but is not intended to limit the present disclosure.

BRIEF DESCRIPTION OF THE DRAWINGS

The accompanying drawings, which are incorporated in and constitute a part of this specification, illustrate the examples consistent with the present disclosure and, together with the description, serve to explain the principles of the disclosure.

DETAILED DESCRIPTION OF THE EMBODIMENTS

Embodiments will be described in detail here with the examples thereof expressed in the drawings. Where the following descriptions involve the drawings, like numerals in different drawings refer to like or similar elements unless otherwise indicated. The implementation manners described in the following exemplary embodiments do not represent all implementation manners consistent with the present disclosure. Rather, they are merely examples of apparatuses and methods consistent with some aspects of the present disclosure as detailed in the appended claims.

The terminology used herein is for the purpose of describing particular examples only and is not intended to be limiting of examples. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements and/or components, but do not preclude the presence or addition of one or more other features, integers, steps, operations, elements, components and/or groups thereof.

In the related technologies, in research discussion on the 5G project, a conditional handover technology refers to that after a base station transmit a handover command to user equipment (UE), the UE will not execute cell handover immediately, but execute the cell handover only when meeting a condition. In the related technologies, the UE immediately starts a handover timer T304 after receiving the handover command, and, records a type of connection failure as a handover failure in a Radio Link Failure-Report (VarRLF-Report, for short) when the timer expires.

When executing conditional handover, the VarRLF-Report recorded by the UE has an inaccurate content. In this way, the base station cannot accurately pinpoint the problem of the handover failure, and thus cannot adjust triggering for cell handover of the UE to improve the mobility performance of the UE.

Figure 1:
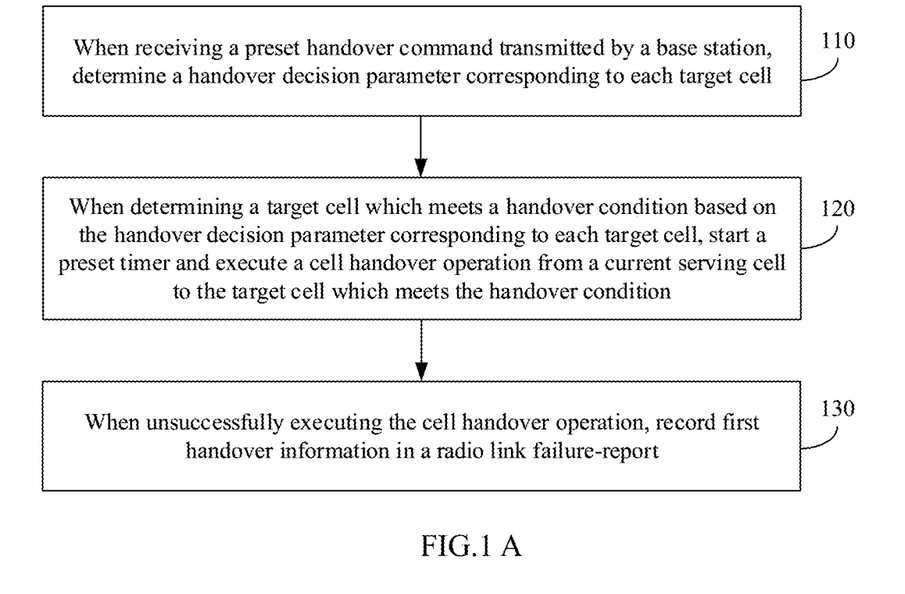
FIG. 1A is a flowchart illustrating a method of cell handover according to some embodiments.
FIG. 1B is a schematic diagram illustrating a method of cell handover according to some embodiments.

FIG. 1A is a flowchart illustrating a method of cell handover according to some embodiments, and FIG. 1B is a scenario diagram illustrating a method of cell handover according to some embodiments. As shown in FIG. 1A, the method of cell handover can be applied to UE, and include following steps 110-130.

In step 110, when receiving a preset handover command transmitted by a base station, a handover decision parameter corresponding to each target cell is determined.

In some embodiments, the preset handover command is used to represent a conditional handover command, that is, the UE does not execute cell handover immediately when receiving the conditional handover command, but execute the cell handover operation only when a target cell meets a handover condition.

In some embodiments, the handover decision parameter corresponding to each target cell can include, but are not limited to, any one parameter or a combination of two or more parameters: Reference Signal Receiving Power (RSRP), a Received Signal Strength Indicator (RSSI), and Reference Signal Receiving Quality (RSRQ).

In some embodiments, the handover decision parameter corresponding to each target cell can be different. For example, the handover decision parameter corresponding to target cell A is the RSSI greater than −75 dBm, and the handover decision parameter corresponding to target cell B is the RSSI greater than −85 dBm.

In some embodiments, the handover decision parameter corresponding to each target cell are obtained by analyzing the preset handover command.

In step 120, when determining a target cell that meets a handover condition based on the handover decision parameter corresponding to each target cell, a preset timer is started, and a cell handover operation from a current serving cell to the target cell that meets the handover condition is executed.

In some embodiments, after receiving the conditional handover command, the UE can perform measurement for each target cell in real time to obtain a measurement result of each target cell. When a measurement result of a target cell matches the corresponding handover decision parameter, it can be determined that the target cell meets the handover condition. For example, if the handover decision parameter of target cell A is the RSSI greater than −75 dBm, and the RSSI of the target cell A measured by the UE is −70 dBm, it can be determined that the target cell A meets the handover condition.

In some embodiments, the preset timer can be a T304 timer, that is, duration of the timer T304 is used when cell handover is performed. In some embodiments, the preset timer can also be another preset timer for cell handover.

In some embodiments, the preset handover command can further carry radio link configuration information of the target cells, and the UE can execute the cell handover operation based on the radio link configuration information in the preset handover command.

In step 130, first handover information is recorded in a radio link failure-report, when unsuccessfully executing the cell handover operation.

In some embodiments, an execution failure of the cell handover operation may be interpreted as meaning that the preset timer has expired when the UE has not successfully switched to the target cell, or a radio link failure occurs in the process of handover, and so on.

In some embodiments, the first handover information includes but is not limited to any one or a combination of two or more: a type of connection failure being a conditional handover failure, a time interval between a time when receiving the preset handover command and a time when unsuccessfully executing the cell handover operation, a time interval between a time when starting the preset timer and a time when unsuccessfully executing the cell handover operation, and cell identity information of the target cell that executes the cell handover operation.

In some embodiments, when the base station requests a radio link failure-report from the UE, the UE can transmit a report message carrying the radio link failure-report to the base station.

In an exemplary scenario, as shown in FIG. 1B, take the mobile network being the LTE network and the base station being an evolved node B (eNB) as an example for illustration.

In the scenario shown in FIG. 1B, eNB 10 and UE 20 are included. The UE 20 can first determine a target cell that meets a handover condition when receiving a preset handover command transmitted by the eNB 10, and then the UE 20 starts a preset timer and executes the cell handover operation.

When the cell handover fails, the UE 20 records first handover information in a radio link failure-report, where the first handover information includes but is not limited to a type of connection failure being a conditional handover failure, a time interval between a time when receiving the preset handover command and a time when unsuccessfully executing the cell handover operation, a time interval between a time when starting the preset timer and a time when unsuccessfully executing the cell handover operation, and cell identity information of the target cell that executes the cell handover operation.

Therefore, after requesting the radio link failure-report, the base station can pinpoint the problem of the handover failure based on the first handover information, so as to ensure that the UE can trigger the handover process and try to avoid radio link failure, thereby improving the mobility performance of the UE.

By the above steps 110 to 130, according to the example, the UE can be enabled to start the preset timer when receiving the conditional handover command and starting to execute the cell handover operation, so as to ensure that the UE can trigger the handover process and avoid occurrence of a radio link failure, thereby improving mobility performance of the UE.

In some embodiments, the method of cell handover can further include:

when a radio link failure occurs before determining the target cell that meets the handover condition based on the handover decision parameter corresponding to each target cell, recording second handover information in the radio link failure-report.

In some embodiments, the second handover information includes a time interval between a time when receiving the preset handover command and a time when the radio link failure occurs.

In some embodiments, the first handover information includes any one or a combination of two or more: a type of connection failure being a conditional handover failure, a time interval between a time when receiving the preset handover command and a time when unsuccessfully executing the cell handover operation, a time interval between a time when starting the preset timer and a time when unsuccessfully executing the cell handover operation, and cell identity information of the target cell that executes the cell handover operation.

In some embodiments, the method of cell handover further includes:

performing measurement for a signal from each target cell in real time to obtain a measurement result corresponding to each target cell; and determining whether each target cell meets the handover condition based on the measurement result corresponding to each target cell and the handover decision parameter corresponding to each target cell.

In some embodiments, the method of cell handover can further include:

stopping the preset timer when successfully executing the cell handover operation.

In some embodiments, the method of cell handover can further include:

receiving a request message for obtaining the radio link failure-report transmitted by the base station; and transmitting a report message carrying the radio link failure-report to the base station.

Please refer to the following examples for specific implementation of cell handover.

Thus, according to the methods provided in the aforesaid examples of the present disclosure, the UE can be enabled to start the preset timer and execute the cell handover operation when determining the target cell that meets the handover condition, so as to ensure that the UE can trigger the handover process and avoid occurrence of a radio link failure, thereby improving mobility performance of the UE. In addition, in a case that a radio link failure occurs, the UE can accurately record handover information of the conditional handover, and then the bound base station pinpoints the problem of the handover failure, so as to modify the corresponding parameter and try to avoid the radio link failure of the UE.

The technical solutions provided by the examples of the present disclosure are illustrated below with specific examples.

Figure 2:
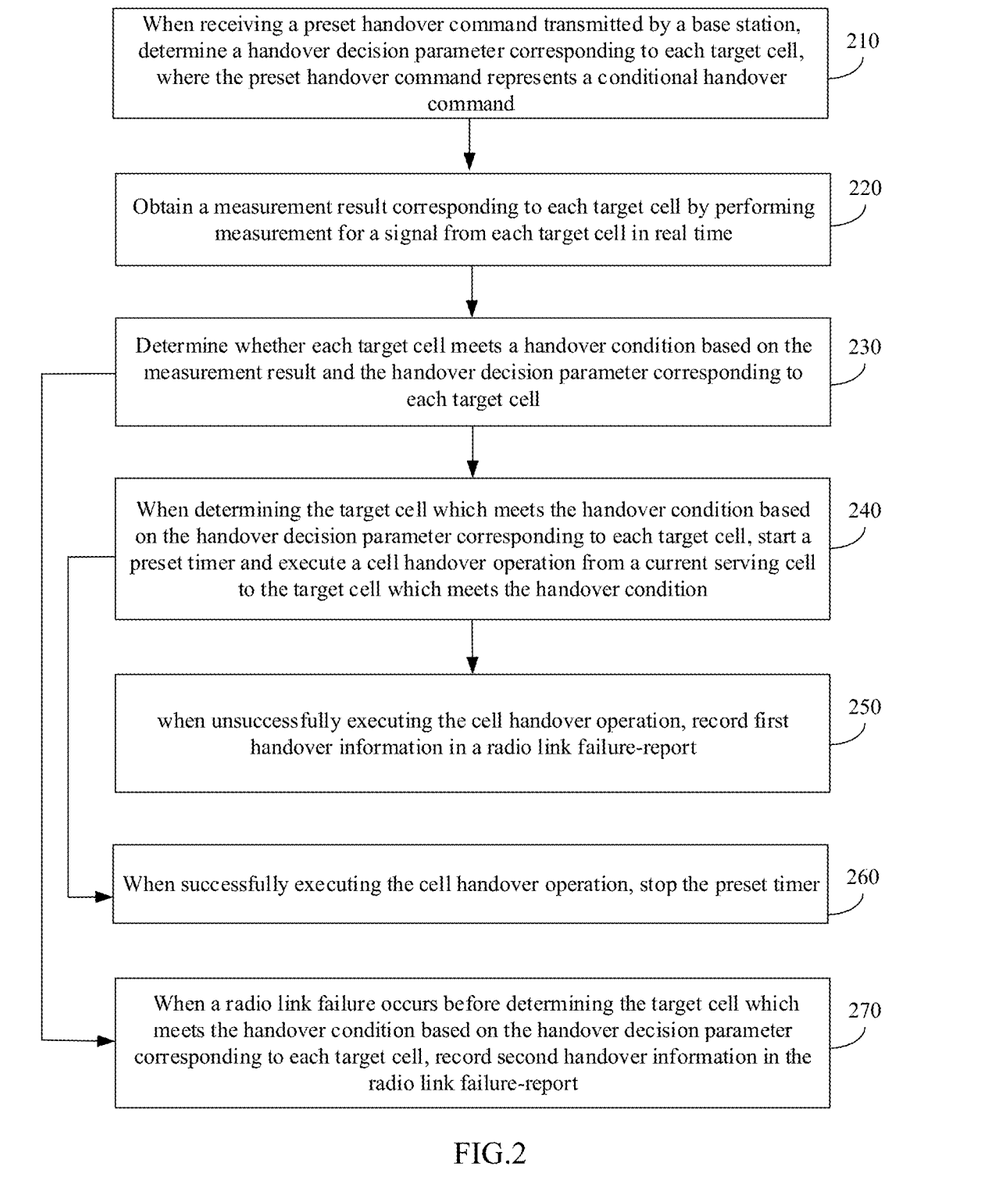
FIG. 2 is a flowchart illustrating another method of cell handover according to some embodiments.

FIG. 2 is a flowchart illustrating another method of cell handover according to some embodiments. The example uses the above methods provided by the examples of the present disclosure to illustrate the conditional handover of the UE. As shown in FIG. 2, the method includes the following steps.

In step 210, when receiving a preset handover command transmitted by a base station, a handover decision parameter corresponding to each target cell is determined, where the preset handover command indicates a conditional handover command.

In step 220, a measurement result corresponding to each target cell is obtained by performing measurement for a signal from each target cell in real time.

In some embodiments, the measurement results can include values of the RSRP, and/or the RSSI, and/or the RSRQ.

In step in 230, whether each target cell meets a handover condition is determined based on the measurement result corresponding to each target cell and the handover decision parameter corresponding to each target cell. When determining a target cell that meets the handover condition based on the handover decision parameter corresponding to each target cell, step 240 is executed. When a radio link failure occurs before determining the target cell that meets the handover condition based on the handover decision parameter corresponding to each of the target cell, step 270 is executed.

In some embodiments, the measurement result of each target cell can be compared to the handover decision parameter. If the measurement result of a target cell matches the handover decision parameter, it indicates that the target cell meets the handover condition, otherwise, the target cell does not meet the handover condition.

In some embodiments, when two or more target cells meet the handover condition, the target cell with better signal quality can be selected as the target cell to which the UE will be switched.

In step 240, when determining the target cell that meets the handover condition based on the handover decision parameter corresponding to each target cell, a preset timer is stared and a cell handover operation from a current serving cell to the target cell that meets the handover condition is executed. Steps 250 and 260 are executed.

In some embodiments, the description of the step 240 may refer to the description of the step 120 in the example shown in FIG. 1A, which is not detailed described here.

In step 250, when unsuccessfully executing the cell handover operation, first handover information is recorded in a radio link failure-report, where the first handover information is used for reporting to the base station.

In some embodiments, an execution failure of the cell handover operation may be interpreted as meaning that the preset timer has expired when the UE has not successfully switched to the target cell, or a radio link failure occurs in the process of handover, and so on.

In some embodiments, the first handover information includes but is not limited to any one or a combination of two or more: a type of connection failure being a conditional handover failure, a time interval between a time when receiving the preset handover command and a time when unsuccessfully executing the cell handover operation, a time interval between a time when starting the preset timer and a time when unsuccessfully executing the cell handover operation, and cell identity information of the target cell that executes the cell handover operation.

In step 260, when successfully executing the cell handover operation, the preset timer is stopped.

In step 270, when a radio link failure occurs before determining the target cell that meets the handover condition based on the handover decision parameter corresponding to each target cell, second handover information is recorded in the radio link failure-report, where the second handover information is used for reporting to the base station.

In some embodiments, the second handover information includes but is not limited to: a time interval between a time when receiving the preset handover command and a time when the radio link failure occurs.

In the example, the UE can start the preset timer and execute the cell handover operation when determining the target cell that meets the handover condition, so as to ensure that the UE can trigger the handover process and avoid occurrence of a radio link failure, thereby improving mobility performance of the UE. In addition, in a case that a radio link failure occurs, the UE can accurately record handover information of the conditional handover, and then the bound base station pinpoints the problem of the handover failure, so as to modify the corresponding parameter and try to avoid the radio link failure of the UE.

Figure 3:
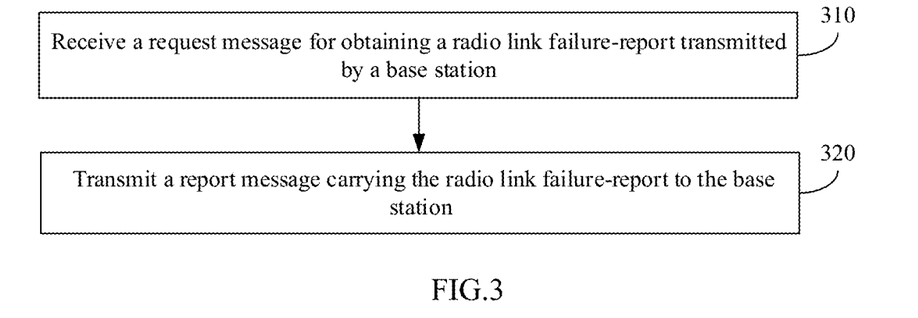
FIG. 3 is a flowchart illustrating still another method of cell handover according to some embodiments.

FIG. 3 is a flowchart illustrating still another method of cell handover according to some embodiments. The example uses the above methods provided by the examples of the present disclosure to illustrate how to report the radio link failure-report. As shown in FIG. 3, the method includes the following steps.

In step 310, a request message for obtaining a radio link failure-report transmitted by a base station is received.

In some embodiments, the UE can normally transmit an indication message to the base station when a problem such as a handover failure or a radio link failure occurs, and the base station can transmit the request message for obtaining the radio link failure-report to the UE as required.

In step 320, a report message carrying the radio link failure-report is transmitted to the base station.

In some embodiments, when a radio link failure occurs before the UE does not determine that the target cell that meets the handover condition, the UE can record a time interval in the radio link failure-report between a time when receiving the preset handover command and a time when the radio link failure occurs.

In some embodiments, when a handover failure occurs after starting the preset timer to execute the cell handover operation, the UE can record a type of connection failure being a conditional handover failure, a time interval between a time when receiving the preset handover command and a time when unsuccessfully executing the cell handover operation, and a time interval between a time when starting the preset timer and a time when unsuccessfully executing the cell handover operation.

In this example, the information recorded in the radio link failure-report of the UE in a process of executing the conditional handover is different from the information recorded in the radio link failure-report in a process of executing the direct handover, which can effectively help the base station to distinguish different modes of handover and reduce difficulty of the base station in pinpointing the problem of the handover failure, thereby reducing possibility of the radio link failure.

Figure 4:
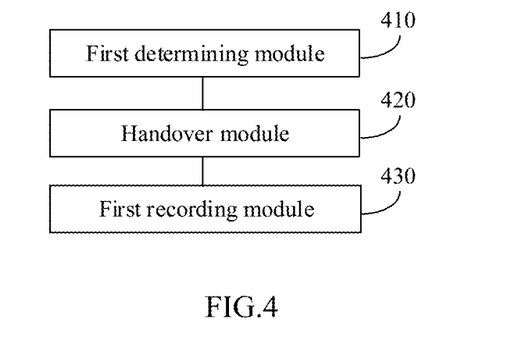
FIG. 4 is a block diagram illustrating an apparatus for cell handover according to some embodiments.

FIG. 4 is a block diagram illustrating an apparatus for cell handover according to some embodiments. As shown in FIG. 4, the apparatus includes:

a first determining module 410, configured to determine a handover decision parameter corresponding to each target cell, when receiving a preset handover command transmitted by a base station, wherein the preset handover command indicates a conditional handover command;

a handover module 420, configured to start a preset timer and execute a cell handover operation from a current serving cell to a target cell that meets a handover condition, when determining the target cell that meets the handover condition based on the handover decision parameter corresponding to each target cell determined by the first determining module 410; and a first recording module 430, configured to record first handover information in a radio link failure-report, when unsuccessfully executing the cell handover operation by the handover module 420.

Figure 5:
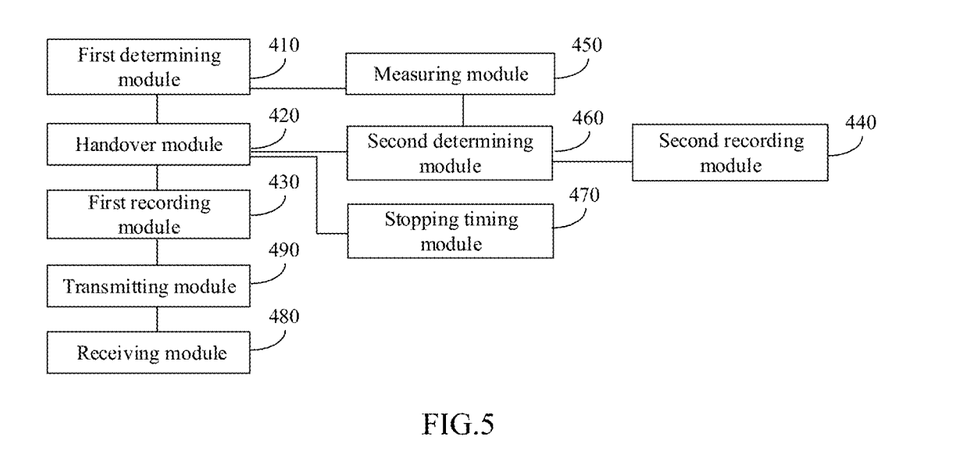
FIG. 5 is a block diagram illustrating another apparatus for cell handover according to some embodiments.

FIG. 5 is a block diagram illustrating another apparatus for cell handover according to some embodiments. As shown in FIG. 5, based on the example shown in FIG. 4, in some embodiments, the apparatus further includes:

a second recording module 440, configured to record second handover information in the radio link failure-report, when a radio link failure occurs before determining the target cell that meets the handover condition based on the handover decision parameter corresponding to each target cell.

The various device components, units, blocks, or portions may have modular configurations, or are composed of discrete components, but nonetheless can be referred to as "modules" in general. In other words, the "components," "modules," "blocks," "portions," or "units" referred to herein may or may not be in modular forms.

In some embodiments, the second handover information includes but is not limited to a time interval between a time when receiving the preset handover command and a time when the radio link failure occurs.

In some embodiments, the first handover information includes but is not limited to any one or a combination of two or more: a type of connection failure being a conditional handover failure, a time interval between a time when receiving the preset handover command and a time when unsuccessfully executing the cell handover operation, a time interval between a time when starting the preset timer and a time when unsuccessfully executing the cell handover operation, and cell identity information of the target cell that executes the cell handover operation.

In some embodiments, the apparatus further includes:

a measuring module 450, configured to obtain a measurement result corresponding to each target cell by performing measurement for a signal from each target cell in real time; and a second determining module 460, configured to determine whether each target cell meets the handover condition based on the measurement result corresponding to each target cell which is obtained by the measuring module 450 and the handover decision parameter corresponding to each target cell.

In some embodiments, the apparatus further includes:

a stopping timing module 470, configured to stop the preset timer when successfully executing the cell handover operation.

In some embodiments, the apparatus further includes:

a receiving module 480, configured to receive a request message for obtaining the radio link failure-report transmitted by the base station; and a transmitting module 490, configured to transmit a report message carrying the radio link failure-report to the base station.

Figure 6:
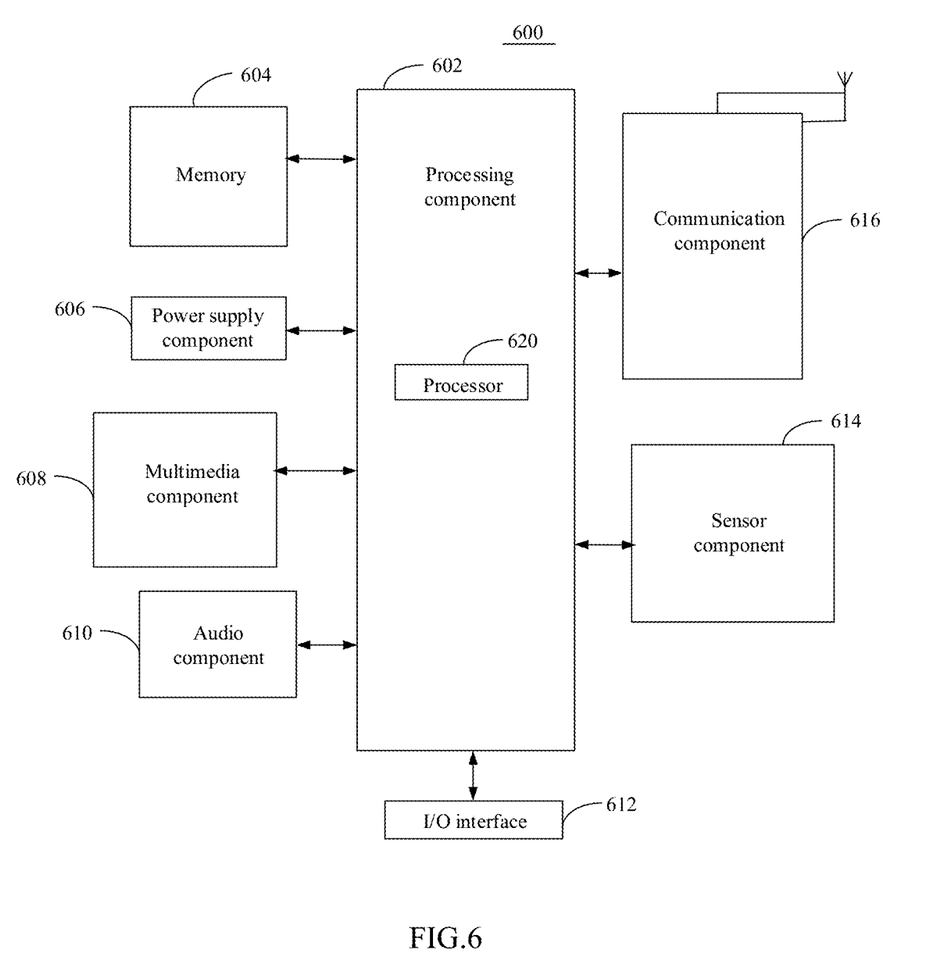
FIG. 6 is a block diagram illustrating an apparatus suitable for cell handover according to some embodiments.

FIG. 6 is a block diagram illustrating an apparatus suitable for cell handover according to some embodiments. For example, an apparatus 600 can be UE such as a mobile telephone, a computer, a digital broadcasting terminal, a message receiving and transmitting device, a game console, a tablet device, a medical device, a fitness device, a personal digital assistant, and so on.

Referring to FIG. 6, the apparatus 600 can include one or more of the following components: a processing component 602, a memory 604, a power supply component 606, a multimedia component 608, an audio component 610, an input/output (I/O) interface 612, a sensor component 614 and a communication component 616.

The processing component 602 generally controls overall operations of the apparatus 600, such as operations associated with display, phone calls, data communications, camera operations, and recording operations. The processing component 602 can include one or more processors 620 to execute instructions to complete all or part of the steps of the above methods. In addition, the processing component 602 can include one or more modules which facilitate the interaction between the processing component 602 and other components. For example, the processing component 602 can include a multimedia module to facilitate the interaction between the multimedia component 608 and the processing component 602.

The memory 604 is to store various types of data to support the operation of the apparatus 600. Examples of such data include instructions for any application or method operated on the apparatus 600, contact data, phonebook data, messages, pictures, videos, and so on. The memory 604 can be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power supply component 606 provides power to different components of the apparatus 600. The power supply component 606 can include a power management system, one or more power supplies, and other components associated with generating, managing, and distributing power for the apparatus 600.

The multimedia component 608 includes a screen providing an output interface between the apparatus 600 and a user. In some examples, the screen can include a Liquid Crystal Display (LCD) and a Touch Panel (TP). In some embodiments, the screen can be other types of displays, such as organic light-emitting diode (OLED) displays.

If the screen includes the TP, the screen can be implemented as a touch screen to receive input signals from the user. The TP can include one or more touch sensors to sense touches, swipes, and gestures on the TP. The touch sensors can not only sense a boundary of a touch or swipe, but also sense a duration and a pressure associated with the touch or swipe. In some examples, the multimedia component 608 can include a front camera and/or a rear camera. The front camera and/or rear camera can receive external multimedia data when the apparatus 600 is in an operating mode, such as a photographing mode or a video mode. Each of the front camera and the rear camera can be a fixed optical lens system or have focal length and optical zooming capability.

The audio component 610 is to output and/or input an audio signal. For example, the audio component 610 includes a microphone (MIC). When the apparatus 600 is in an operating mode, such as a call mode, a recording mode, and a voice recognition mode, the MIC is to receive an external audio signal. The received audio signal can be further stored in the memory 604 or sent via the communication component 616. In some examples, the audio component 610 further includes a speaker to output an audio signal.

The I/O interface 612 can provide an interface between the processing component 602 and peripheral interface modules. The above peripheral interface modules can include a keyboard, a click wheel, buttons and so on. These buttons can include, but are not limited to, a home button, a volume button, a starting button and a locking button.

The sensor component 614 includes one or more sensors to provide status assessments of various aspects for the apparatus 600. For example, the sensor component 614 can detect the on/off status of the apparatus 600, and relative positioning of component, for example, the component is a display and a keypad of the apparatus 600. The sensor component 614 can also detect a change in position of the apparatus 600 or a component of the apparatus 600, a presence or absence of the contact between a user and the apparatus 600, an orientation or an acceleration/deceleration of the apparatus 600, and a change in temperature of the apparatus 600.

The sensor component 614 can include a proximity sensor to detect the presence of a nearby object without any physical contact. The sensor component 614 can further include an optical sensor, such as a Complementary Metal-Oxide-Semiconductor (CMOS) or Charged Coupled Device (CCD) image sensor which is used in imaging applications. In some examples, the sensor component 614 can further include an acceleration sensor, a gyroscope sensor, a magnetic sensor, a pressure sensor, or a temperature sensor.

The communication component 616 is to facilitate wired or wireless communication between the apparatus 600 and other devices. The apparatus 600 can access a wireless network that is based on a communication standard, such as Wi-Fi, 2G, 3G, 4G, or 5G, or a combination thereof. In some embodiments, the communication component 616 receives a broadcast signal or broadcast-associated information from an external broadcast management system via a broadcast channel.

In some embodiments, the communication component 616 further includes a Near Field Communication (NFC) module to facilitate short-range communications. For example, the NFC module can be implemented based on a Radio Frequency Identification (RFID) technology, an Infrared Data Association (IrDA) technology, an Ultra-Wideband (UWB) technology, a Bluetooth® (BT) technology and other technologies.

In some embodiments, the apparatus 600 can be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above methods.

In some embodiments, a non-volatile machine-readable storage medium including instructions, such as the memory 604 including the instructions, is provided. When the above instructions to be executed, the processor 620 of the apparatus 600 is configured to perform the above methods: when receiving a preset handover command transmitted by a base station, determining a handover decision parameter corresponding to each target cell, wherein the preset handover command indicates a conditional handover command;

when determining a target cell that meets a handover condition based on the handover decision parameter corresponding to each target cell, starting a preset timer and executing a cell handover operation from a current serving cell to the target cell that meets the handover condition; and when unsuccessfully executing the cell handover operation, recording first handover information in a radio link failure-report, where the first handover information is used for reporting to the base station.

In some embodiments, the non-volatile machine-readable storage medium can be a ROM, a Random-Access Memory (RAM), a CD-ROM, a magnetic tape, a floppy disk, and an optical data storage device and the likes.

Various embodiments of the present disclosure can have one or more of the following advantages. Through the above technical solutions, when receiving the conditional handover command transmitted by the base station and determining the target cell that meets the handover condition, the UE can be enabled to start the preset timer and execute the cell handover operation, so as to ensure that the UE can trigger a handover process and avoid occurrence of a radio link failure, thereby improving mobility performance of the UE.

In the present disclosure, it is to be understood that the terms "lower," "upper," "front," "left," "top," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on," a second element may indicate direct contact between the first and second elements, without contact, or indirect through an intermediate medium, unless otherwise explicitly stated and defined.

In the description of the present disclosure, the terms "some embodiments," "example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

Implementations of the subject matter and the operations described in this disclosure can be implemented with hardware such as digital electronic circuitry or processing circuits, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded or stored on one or more non-transitory computer-readable storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method of cell handover, comprising:
   upon receiving a preset handover command transmitted by a base station, determining a handover decision parameter corresponding to each target cell, wherein the preset handover command indicates a conditional handover command;
   upon determining a target cell that meets a handover condition based on the handover decision parameter corresponding to each target cell, starting a T304 timer and executing a cell handover operation from a current serving cell to the target cell that meets the handover condition; and
   upon unsuccessfully executing the cell handover operation, recording first handover information in a radio link failure-report, wherein the first handover information at least indicates a time interval between a time when starting the T304 timer and a time when unsuccessfully executing the cell handover operation.

2. The method according to claim 1, further comprising:
   when a radio link failure occurs before determining the target cell that meets the handover condition based on the handover decision parameter corresponding to each target cell, recording second handover information in the radio link failure-report.

3. The method according to claim 2, wherein the second handover information comprises:
   a time interval between a time when receiving the preset handover command and a time when the radio link failure occurs.

4. The method according to claim 1, wherein the first handover information further comprises one or more of:
   a type of connection failure being a conditional handover failure,
   a time interval between a time when receiving the preset handover command and a time when unsuccessfully executing the cell handover operation, and cell identity information of the target cell that executes the cell handover operation.

5. The method according to claim 4, wherein the unsuccessfully executing the cell handover operation comprises one of the following two cases:
the T304 timer has expired when user equipment has not successfully switched to the target cell, or
a radio link failure occurs in a process of the cell handover operation.

6. The method according to claim 1, further comprising:
obtaining a measurement result corresponding to each target cell by performing measurement for a signal from each target cell in real time; and
determining whether each target cell meets the handover condition based on the measurement result corresponding to each target cell and the handover decision parameter corresponding to each target cell.

7. The method according to claim 1, further comprising:
when successfully executing the cell handover operation, stopping the T304 timer.

8. The method according to claim 1, further comprising:
receiving a request message for obtaining the radio link failure-report transmitted by the base station; and
transmitting a report message carrying the radio link failure-report to the base station.

9. A user equipment, comprising:
a processor; and
a memory for storing processor executable instructions;
wherein, the processor is configured to:
upon receiving a preset handover command transmitted by a base station, determine a handover decision parameter corresponding to each target cell, wherein the preset handover command indicates a conditional handover command;
upon determining a target cell that meets a handover condition based on the handover decision parameter corresponding to each target cell, start a T304 timer and execute a cell handover operation from a current serving cell to the target cell that meets the handover condition; and
upon unsuccessfully executing the cell handover operation, record first handover information in a radio link failure-report, wherein the first handover information at least indicates a time interval between a time when starting the T304 timer and a time when unsuccessfully executing the cell handover operation.

10. The user equipment according to claim 9, wherein the processor is further configured to:
when a radio link failure occurs before determining the target cell that meets the handover condition based on the handover decision parameter corresponding to each target cell, record second handover information in the radio link failure-report.

11. The user equipment according to claim 10, wherein the second handover information comprises:
a time interval between a time when receiving the preset handover command and a time when the radio link failure occurs.

12. The user equipment according to claim 9, wherein first handover information further comprises any one or more of:
a type of connection failure being a conditional handover failure,
a time interval between a time when receiving the preset handover command and a time when unsuccessfully executing the cell handover operation, and
cell identity information of the target cell that executes the cell handover operation.

13. The user equipment according to claim 9, wherein the processor is further configured to:
obtain a measurement result corresponding to each target cell by performing measurement for a signal from each target cell in real time; and
determine whether each target cell meets the handover condition based on the measurement result corresponding to each target cell and the handover decision parameter corresponding to each target cell.

14. The user equipment according to claim 9, wherein the processor is further configured to:
when successfully executing the cell handover operation, stop the T304 timer.

15. The user equipment according to claim 9, wherein the processor is further configured to:
receive a request message for obtaining the radio link failure-report transmitted by the base station; and
transmit a report message carrying the radio link failure-report to the base station.

16. The user equipment according to claim 9, wherein the handover decision parameter corresponding to each target cell comprises at least one of Reference Signal Receiving Power (RSRP), Received Signal Strength Indicator (RSSI), or Reference Signal Receiving Quality (RSRQ).

17. The user equipment according to claim 16, wherein the handover decision parameter corresponding to different target cell is different.

18. The user equipment according to claim 17, wherein the handover decision parameter corresponding a first target cell is the RSSI greater than −75 dBm, and the handover decision parameter corresponding to a second target cell is the RSSI greater than −85 dBm.

19. The user equipment according to claim 18, wherein the user equipment is configured to perform measurement for each target cell in real time to obtain a measurement result of each target cell to thereby determine whether the measurement result of the each target cell matches the corresponding handover decision parameter, and wherein the measurement result comprises a measured RSSI of the each cell.

20. A non-transitory computer-readable storage medium storing instructions, wherein the instructions are executed by a processor to implement operations including:
upon receiving a preset handover command transmitted by a base station, determining a handover decision parameter corresponding to each target cell, wherein the preset handover command indicates a conditional handover command;
upon determining a target cell that meets a handover condition based on the handover decision parameter corresponding to each target cell, starting a T304 timer and executing a cell handover operation from a current serving cell to the target cell that meets the handover condition; and
upon unsuccessfully executing the cell handover operation, recording first handover information in a radio link failure-report, wherein the first handover information at least indicates a time interval between a time when starting the T304 timer and a time when unsuccessfully executing the cell handover operation.

* * * * *